(12) United States Patent
Faux

(10) Patent No.: US 8,777,327 B1
(45) Date of Patent: Jul. 15, 2014

(54) LOCKING WHEEL NUT COVER

(76) Inventor: Adam F. Faux, Melbourne (AU)

( * ) Notice: Subject to any disclaimer, the term of this patent is extended or adjusted under 35 U.S.C. 154(b) by 221 days.

(21) Appl. No.: 13/486,170

(22) Filed: Jun. 1, 2012

(51) Int. Cl.
*B60B 7/16* (2006.01)

(52) U.S. Cl.
USPC ...................................... 301/37.21

(58) Field of Classification Search
CPC .......... B60B 7/0013; B60B 7/04; B60B 7/06; B60B 7/063; B60B 7/16
USPC .......... 301/37.101, 37.21, 37.102, 37, 34, 35, 301/37.36, 37.106, 37.371, 37.374, 108.1
See application file for complete search history.

(56) References Cited

U.S. PATENT DOCUMENTS

| | | | | |
|---|---|---|---|---|
| 2,722,822 A | * | 11/1955 | Thomas | .......................... 70/167 |
| 4,161,869 A | * | 7/1979 | Dixon | ............................ 70/166 |
| 4,553,414 A | * | 11/1985 | Caputo et al. | ..................... 70/58 |
| 4,874,206 A | | 10/1989 | Sampson | |
| D305,635 S | | 1/1990 | Pope | |
| 6,227,623 B1 | | 5/2001 | Bellow | |
| 6,419,326 B1 | * | 7/2002 | Rains | .......................... 301/37.21 |
| 6,692,085 B1 | | 2/2004 | Threadgill | |
| 6,863,353 B1 | | 3/2005 | Buckner | |
| 6,871,914 B2 | | 3/2005 | Stewart, Jr. | |
| 2003/0201666 A1 | | 10/2003 | Artessa et al. | |

* cited by examiner

*Primary Examiner* — S. Joseph Morano
*Assistant Examiner* — Jean Charleston

(57) ABSTRACT

A locking wheel nut cover system for controlling access to wheel nuts used to affix a wheel to a vehicle has a wheel with a wheel rim annular channel. The system has a wheel nut located on an axle stud for securing the wheel to the vehicle. The system has a generally planar round hub cover with a hub cover aperture for positioning in front of a wheel central hub to cover the wheel nuts. The system has a plurality of generally planar elongated locking arms, each having an elongated slot, and a locking arm second end for engaging the wheel rim annular channel. The system has a generally cylindrical keyed lock for engaging the locking arms and the hub cover to secure the system into place for wheel theft protection.

3 Claims, 4 Drawing Sheets

LOCKING WHEEL NUT COVER

BACKGROUND OF THE INVENTION

The theft of vehicles and vehicle related equipment has been a cause for alarm for nearly as long as vehicles themselves have existed. Many varied efforts have been expended to attempt to stop or at least slow the rate of vehicle and vehicle related theft. Often times the vehicle has been stolen to simply sell the items that are easy to remove such as car stereo systems and wheel/tire combinations. Security deterrents such as car alarms or physical restraint my help impede potential thieves to a degree, yet the problem of vehicle and vehicle related theft has continued to remain. The present invention features a locking wheel nut cover system for controlling access to a plurality of wheel nuts used to affix a wheel to a vehicle to inhibit theft of a vehicle's wheels and tires.

SUMMARY

The present invention features a locking wheel nut cover system for controlling access to a plurality of wheel nuts used to affix a wheel to a vehicle. In some embodiments, the system comprises a wheel having a wheel rim annular channel located on a wheel rim front face. In some embodiments, the system comprises a wheel nut located on an axle stud. In some embodiments, the system comprises a generally planar round hub cover. In some embodiments, the hub cover comprises a centrally located hub cover aperture.

In some embodiments, the system comprises a plurality of generally planar elongated locking arms. In some embodiments, the locking arm comprises an elongated slot. In some embodiments, a locking arm second end is for engaging the wheel rim annular channel. In some embodiments, the system comprises a generally cylindrical keyed lock. In some embodiments, the keyed lock comprises an engagement length equivalent to a combined thickness of the hub cover and the locking arms.

In some embodiments, upon installation the hub cover is positioned in place in front of a wheel central hub. In some embodiments, the hub cover is for covering the wheel nuts. In some embodiments, the locking arms are for engaging the wheel rim annular channel. In some embodiments, the keyed lock is for engaging the locking arms and the hub cover for securing the system into place for wheel theft protection.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Following is a list of elements corresponding to a particular element referred to herein:

| | |
|---|---|
| 100 | Locking wheel nut cover system |
| 200 | Wheel |
| 210 | Wheel central hub |
| 220 | Wheel central axis |
| 230 | Wheel aperture |
| 240 | Wheel rim |
| 250 | Wheel rim annular channel |
| 260 | Wheel rim outer periphery |
| 270 | Wheel rim front face |
| 300 | Wheel nut |
| 400 | Hub cover |
| 410 | Hub cover aperture |
| 420 | Hub cover thickness |
| 500 | Locking arm |
| 510 | Locking arm first end |
| 520 | Locking arm second end |
| 530 | Locking arm middle |
| 540 | Locking arm front surface |
| 550 | Locking arm elongated slot |
| 560 | Locking arm thickness |
| 600 | Keyed lock |
| 610 | Keyed lock body |
| 620 | Keyed lock body diameter |
| 630 | Keyed lock first end |
| 640 | Keyed lock second end |
| 660 | Keyed lock engagement tip |
| 662 | Keyed lock engagement tip front side |
| 670 | Keyed lock face |
| 672 | Keyed lock face back side |
| 674 | Keyed lock shoulder |
| 680 | Keyhole |
| 690 | Key |
| 700 | Keyed lock engagement length |

Figure 1:
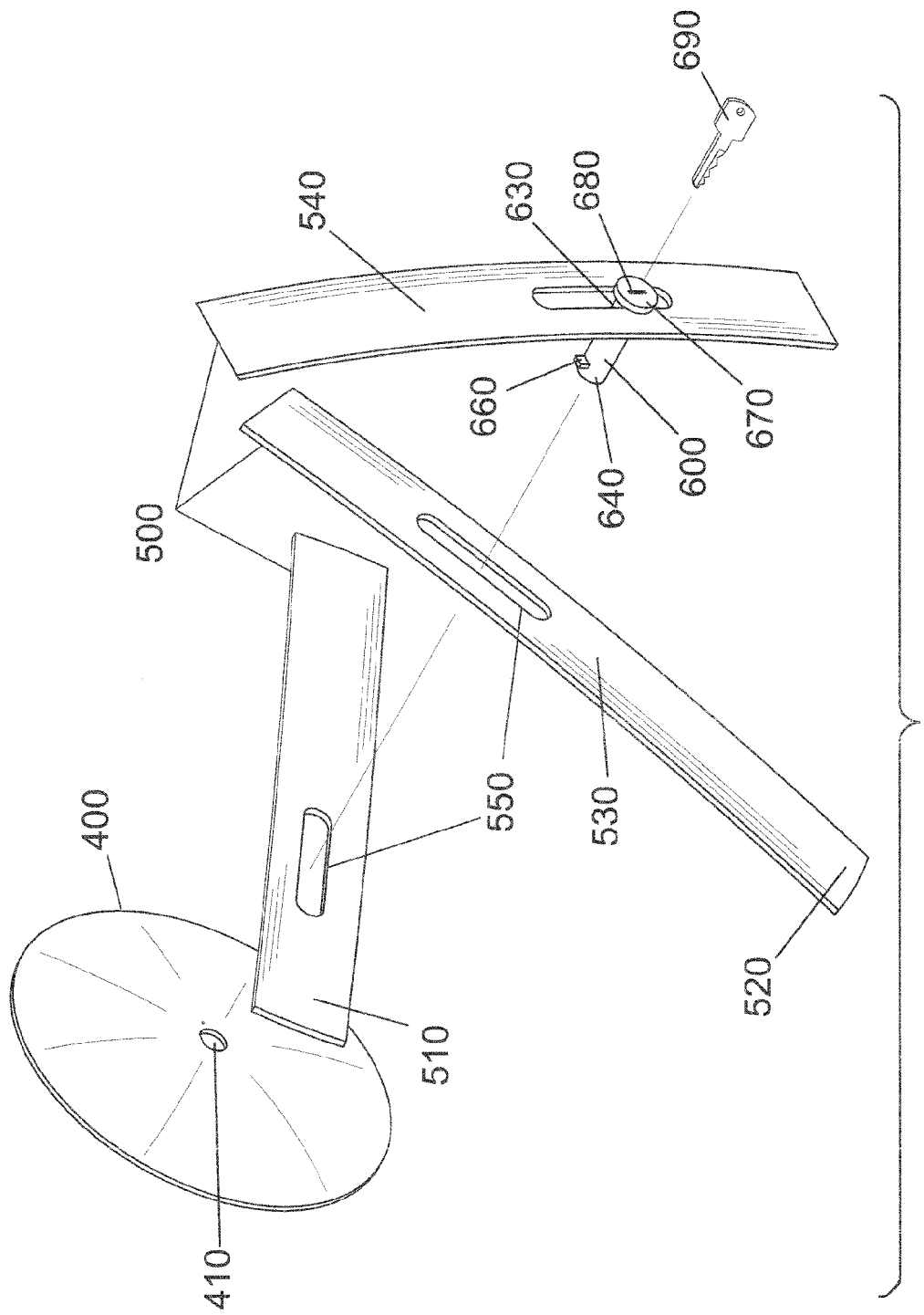
FIG. 1 is a perspective view of the hub cover, the locking arms, and the keyed lock of the present invention.
Figure 2:
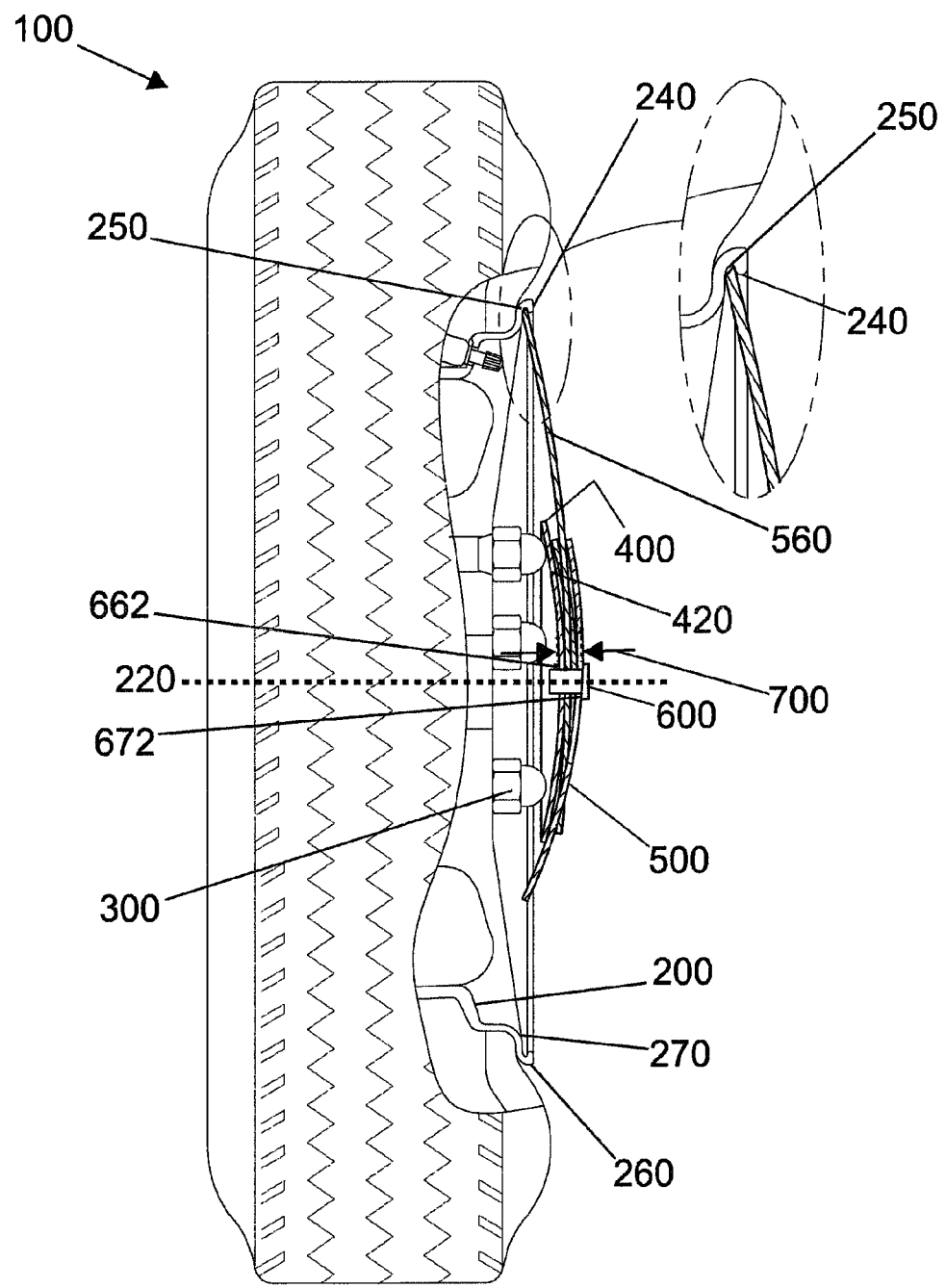
FIG. 2 is a side cutaway view of the present invention.
Figure 3:
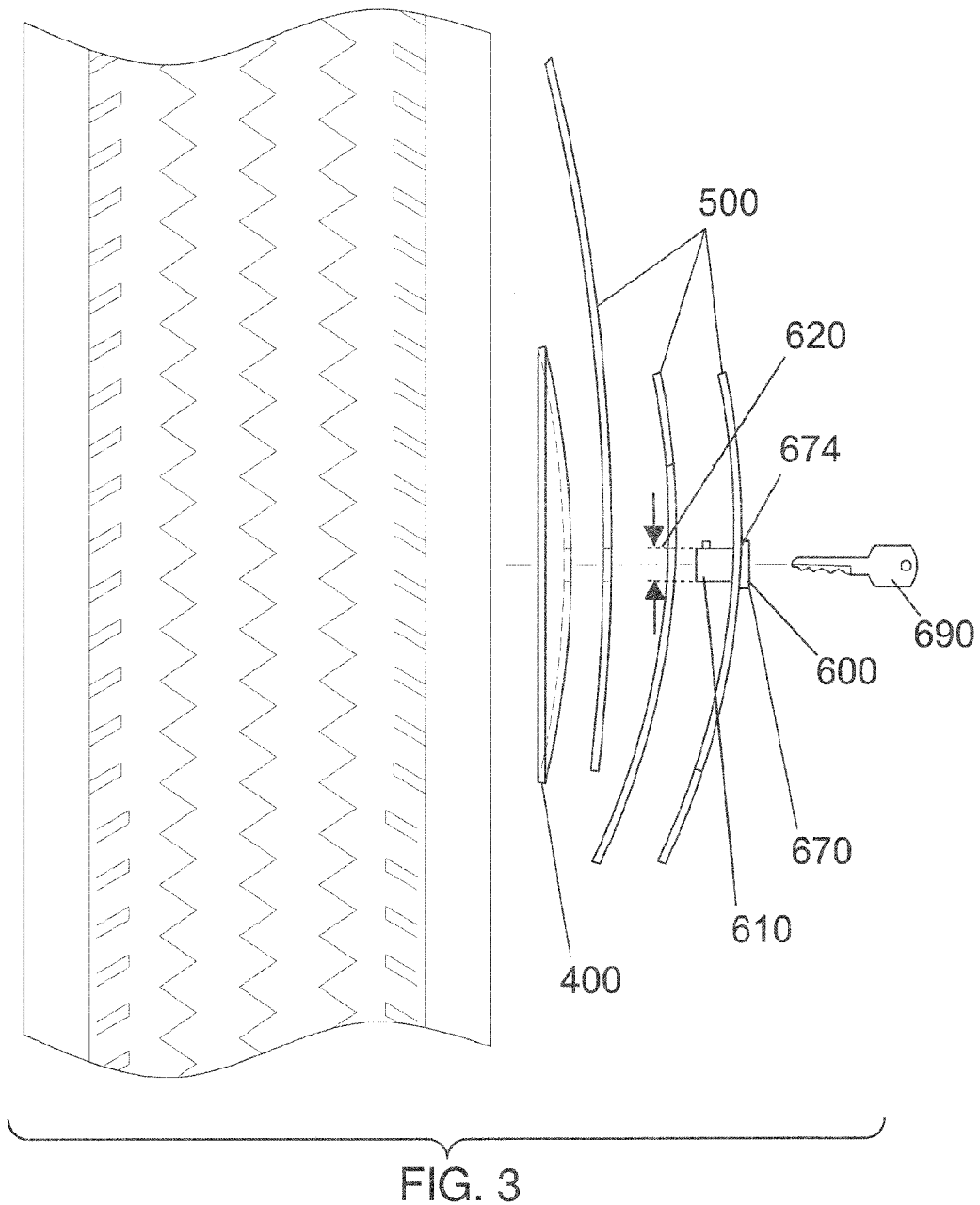
FIG. 3 is a side view of the present invention.
Figure 4:
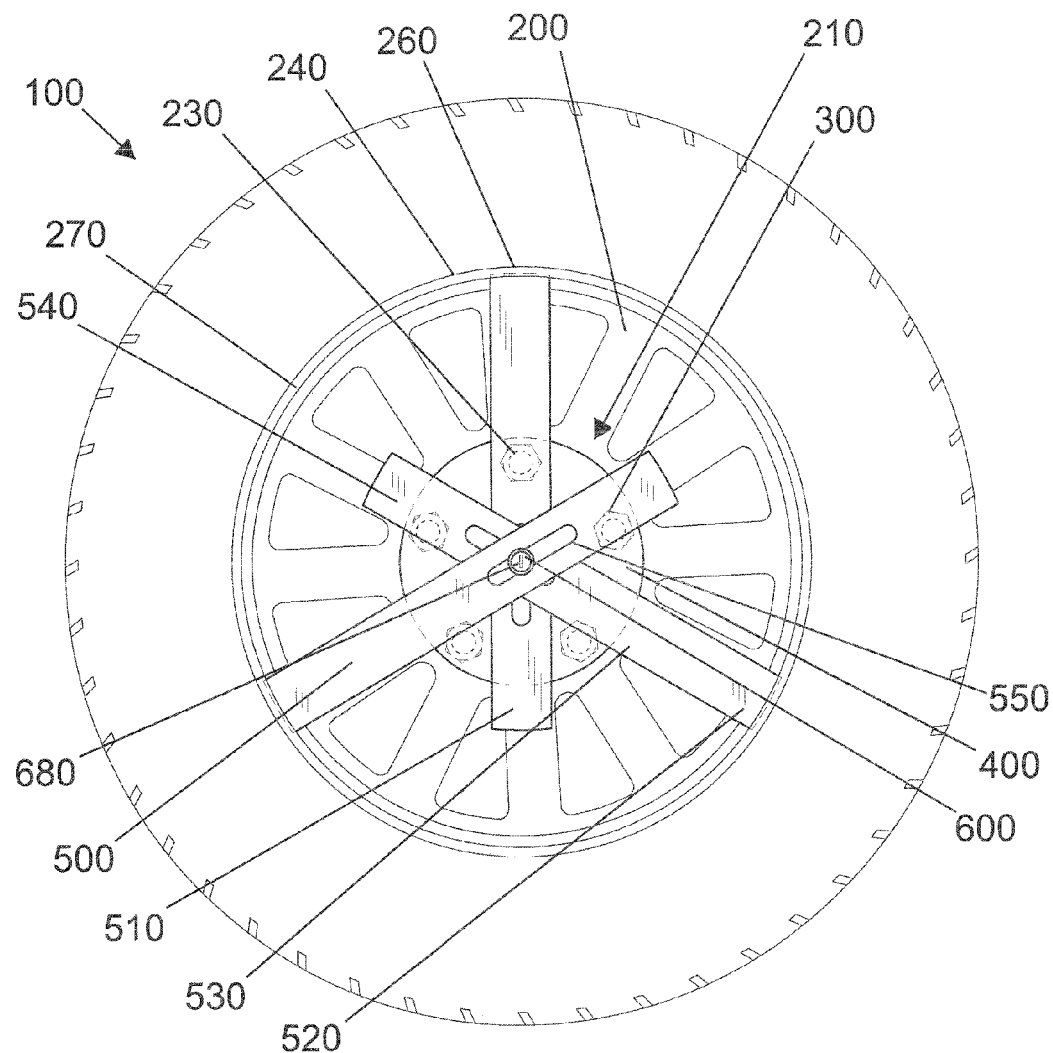
FIG. 4 is a front view of the present invention.

Referring now to FIG. 1-4, the present invention features a locking wheel nut cover system (100) for controlling access to a plurality of wheel nuts (300) used to fasten a wheel (200) to an axle of a vehicle. In some embodiments, the system (100) comprises a generally round wheel (200) having a wheel central hub (210) with a plurality of wheel apertures (230) located about a wheel central axis (220) and a wheel rim (240) with a wheel rim annular channel (250) located on and around a wheel rim front face (270) about a wheel rim outer periphery (260). In some embodiments, a plurality of axle studs located on an axle of a vehicle is inserted into and passes through the wheel apertures (230) for positioning the wheel (200) on the vehicle. Wheels (200) are well known to those of ordinary skill in the art. Axle studs are well known to those of ordinary skill in the art. In some embodiments, the wheel central axis (220) projects out and away from the wheel central hub (210) parallel to a horizontal ground surface when the wheel (200) is located on a vehicle.

In some embodiments, the system (100) comprises a wheel nut (300) located on the axle stud. In some embodiments, the wheel nut (300) is for securing the wheel (200) to the axle of the vehicle via mated threads that engage the axle stud. Wheel nuts (300) are well known to those of ordinary skill in the art.

In some embodiments, the system (100) comprises a generally planar rigid hub cover (400) comprising a general shape of a disk. In some embodiments, the hub cover (400) comprises a hub cover aperture (410) centrally located therein. In some embodiments, the hub cover aperture (410) is round. In some embodiments, the hub cover aperture (410) is round with one flat side. In some embodiments, the hub cover (400) is convex. In some embodiments, the hub cover (400) is flat. In some embodiments, the hub cover (400) is concave.

In some embodiments, the system (100) comprises a plurality of generally planar rigid elongated locking arms (500). In some embodiments, the locking arm (500) is generally rectangular. In some embodiments, the locking arm (500) comprises a locking arm first end (510), a locking arm second end (520), a locking arm middle (530), and a locking arm front surface (540). In some embodiments, the locking arm (500) further comprises an locking arm elongated slot (550) linearly located on the locking arm front surface (540) (through a cross-section) between the locking arm first end (510) and the locking arm middle (530). In some embodiments, the locking arm second end (520) is for engaging the wheel rim annular channel (250).

In some embodiments, the locking arm (500) comprises a locking arm thickness (560) of about 1/16 inch. In some embodiments, the locking arm (500) comprises a locking arm thickness (560) of about 1/8 inch. In some embodiments, the locking arm (500) comprises a locking arm thickness (560) of about 3/16 inch. In some embodiments, the locking arm (500) comprises a locking arm thickness (560) of about 1/4 inch. In some embodiments, the locking arm (500) comprises a locking arm thickness (560) greater than about 1/4".

In some embodiments, the system (100) comprises a generally cylindrical keyed lock (600) having a (cylindrical) keyed lock body (610), a spring-loaded keyed lock engagement tip (660) located close to a keyed lock second end (640) on a keyed lock body (610), a keyed lock face (670) having a keyed lock shoulder (674) located on a keyed lock first end (630), and a semi-unique key (690) for inserting into a keyhole (680) located on the keyed lock face (670) for activating the keyed lock (600). In some embodiments, the keyed lock (600) comprises a keyed lock engagement length (700) from the keyed lock engagement tip front side (662) to the keyed lock face back side (672) (or the keyed lock shoulder (674)) equivalent to a combined hub cover thickness (420) and each of the locking arm thickness' (560). In some embodiments, the keyed lock body (610) comprises a flat surface disposed on one side.

In some embodiments, the keyed lock body (610) is able to be received by the locking arm elongated slot (550) located on the locking arm (500). In some embodiments, the keyed lock (600) comprises a keyed lock body diameter (620) generally equivalent to a smallest diameter of the locking arm elongated slot (550). In some embodiments, the keyed lock body (610) passes through the locking arm elongated slot (550) with slideable clearance. In some embodiments, the keyed lock body (610) is able to be received by a plurality of locking arm elongated slots (550) located on a plurality of locking arms (500) stacked one upon another.

In some embodiments, the keyed lock engagement tip (660) is attachably received by the hub cover aperture (410) located on the hub cover (400). Keyed locks (600) are well known to those of ordinary skill in the art. In some embodiments, the keyed lock (600) is a cam lock with a rotating cam. In some embodiments, the keyed lock shoulder (674) compresses against the locking arm front surface (540) of the top locking arm (500) in a series of locking arms (500) stacked upon one another. In some embodiments, the keyed lock shoulder (674) compresses the locking arms (500) together against the hub cover (400) snugly or tightly where they are held securely in place by the keyed lock engagement tip (660) (keyed lock engagement tip front side (662) interfacing with a hub cover (400) back surface once the keyed lock engagement tip (660) is inserted through the hub cover aperture (410) and snaps into place.

In some embodiments, upon installation, the hub cover (400) is positioned anterior to (or in front of) a wheel central hub (210) for covering or blocking the wheel nuts (300). In some embodiments, the locking arms (500) are positioned anterior to (or in front of) the hub cover (400) for engaging the wheel rim annular channel (250) via the plurality of locking arm second ends (520). In some embodiments, the keyed lock (600) is for engaging the plurality of locking arms (500) and attaching the hub cover (400) thereto for securing the system (100) for wheel theft protection via the locking arm elongated slots (550).

In some embodiments, the keyed lock (600) is inserted through the plurality of locking arm elongated slots (550). In some embodiments, the keyed lock (600) is inserted into the hub cover aperture (410). In some embodiments, the keyed lock engagement tip (660) actuates (by snapping into the hub cover aperture (410) to secure the keyed lock (600) and locking arms (500) to the hub cover (400) via the hub cover aperture (410). In some embodiments, the key (690) is for actuating the keyed lock (600) for releasing the hub cover (400) and the locking arms (500).

In some embodiments, the system (100) comprises three locking arms (500). In some embodiments, the system (100) comprises more than three locking arms (500), for example four, five or six locking arms (500).

In some embodiments, the locking arm (500) comprises a general shape of an arc located from the locking arm first end (510) to the locking arm second end (520). In some embodiments, the locking arm front surface (540) is convex (540).

As used herein, the term "about" refers to plus or minus 10% of the referenced number. For example, an embodiment wherein the locking arm is about 10 inches in length includes a locking arm that is between 9 and 11 inches in length.

The disclosures of the following U.S. Patents are incorporated in their entirety by reference herein: U.S. Pat. No. D 305,635; U.S. Pat. Pub. No. 2003/0201666; U.S. Pat. No. 6,871,914; U.S. Pat. No. 6,863,353; U.S. Pat. No. 6,692,085; U.S. Pat. No. 6,227,623; U.S. Pat. No. 4,874,206.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A locking wheel nut cover system (100) for controlling access to a plurality of wheel nuts (300) used to affix a generally round wheel (200) to an axle of a vehicle, wherein said system (100) comprises:

(a) the generally round wheel (200) having a wheel central hub (210) with a plurality of wheel apertures (230) disposed about a wheel central axis (220) thereon and a wheel rim (240) with a wheel rim annular channel (250) disposed on and around a wheel rim front face (270) about a wheel rim outer periphery (260), wherein a plurality of axle studs disposed on the axle of a vehicle insertably passes through the wheel apertures (230) for positioning the wheel (200) on the vehicle;

(b) a wheel nut (300) disposed on the axle stud, wherein the wheel nut (300) is for securing the wheel (200) to the axle of the vehicle via threadably engaging the axle stud;

(c) a generally planar rigid hub cover (400) comprising a general shape of a disk, wherein a hub cover (400) comprises an hub cover aperture (410) centrally disposed through a cross-section therein;

(d) a plurality of generally planar rigid elongated locking arms (500), wherein each locking arm (500) is generally rectangular, wherein each locking arm (500) comprises a locking arm first end (510), a locking arm second end (520), a locking arm middle (530), and a locking arm front surface (540), wherein each locking arm (500) further comprises a locking arm elongated slot (550) linearly disposed through a cross-section thereon on the locking arm front surface (540) between the locking arm first end (510) and the locking arm middle (530), wherein each locking arm second end (520) is for insertably engaging the wheel rim annular channel (250);

(e) a generally cylindrical keyed lock (600) having a keyed lock body (610), a spring-loaded keyed lock engagement tip (660) disposed proximal to a keyed lock second end (640), a shouldered (674) keyed lock face (670) disposed on a keyed lock first end (630), and a key (690) for inserting into a keyhole (680) disposed on the keyed lock face (670) for activating the keyed lock (600), wherein the keyed lock (600) comprises a keyed lock engagement length (700) from the keyed lock engagement tip front side (662) to the keyed lock face back side (672) equivalent to a combined hub cover thickness (420) and each of the locking arm thickness (560), wherein the keyed lock body (610) is able to be received by each of the locking arm elongated slots (550) disposed on the respective locking arms (500), wherein the keyed lock (600) comprises a keyed lock body diameter (620) generally equivalent to a smallest diameter of the locking arm elongated slots (550), wherein the keyed lock body (610) passes through the locking arm elongated slots (550), wherein the keyed lock engagement tip (660) is attachably received by the hub cover aperture (410) disposed on the hub cover (400), wherein upon installation, the hub cover (400) is positioned anterior to the wheel central hub (210) for covering the wheel nuts (300), wherein the locking arms (500) are positioned anterior to the hub cover (400) for engaging the wheel rim annular channel (250) via the plurality of locking arm second ends (520), wherein the keyed lock (600) is for engaging the plurality of locking arms (500) and attaching the hub cover (400) thereto for securing the system (100) for wheel theft protection, wherein the keyed lock (600) is inserted through the plurality of locking arm elongated slots (550), wherein the keyed lock (600) is inserted into the hub cover aperture (410), wherein the keyed lock engagement tip (660) actuates to secure the keyed lock (600) and locking arms (500) to the hub cover (400) via the hub cover aperture (410), wherein the key (690) is for actuating the keyed lock (600) for releasing the hub cover (400) and the locking arms (500).

2. The system (100) of claim 1, wherein the system (100) comprises three locking arms (500).

3. The system (100) of claim 1, wherein the locking arm (500) comprises a general shape of an arc disposed from the locking arm first end (510) to the locking arm second end (520), wherein the locking arm front surface (540) is convex (540).

\* \* \* \* \*